Aug. 3, 1937.  E. E. WOODMAN  2,089,082
AUTOMOBILE LIFT AND TURNTABLE
Filed Sept. 3, 1936  3 Sheets-Sheet 1

INVENTOR.
Enoch E. Woodman.
BY
Louis J. McBane.
ATTORNEY.

Aug. 3, 1937.   E. E. WOODMAN   2,089,082
AUTOMOBILE LIFT AND TURNTABLE
Filed Sept. 3, 1936   3 Sheets-Sheet 2

INVENTOR.
Enoch E. Woodman
BY
Louis J. McBane
ATTORNEY.

Aug. 3, 1937.  E. E. WOODMAN  2,089,082
AUTOMOBILE LIFT AND TURNTABLE
Filed Sept. 3, 1936  3 Sheets-Sheet 3

INVENTOR.
Enoch E. Woodman.
BY Louis J. McBane
ATTORNEY.

Patented Aug. 3, 1937

2,089,082

UNITED STATES PATENT OFFICE 2,089,082

AUTOMOBILE LIFT AND TURNTABLE

Enoch E. Woodman, Lakewood, Ohio

Application September 3, 1936, Serial No. 99,199

20 Claims. (Cl. 254—103)

This invention relates to an automobile lift and turntable.

It is common experience that an automobile occasionally requires servicing that involves lifting the automobile clear of the ground. It is convenient, at such times, to be able to turn the automobile about a vertical axis while it is lifted from the ground. In addition to the need for servicing the automobile occasionally, it is also common experience that many driveways into private garages are so situated that it is both desirable to turn the automobile around in the driveway and, at the same time, it is difficult to do so without operating the car beyond the confines of the driveway. It is desirable to provide a lift and turntable which may be operated for raising an automobile from the ground and for turning it end to end, in the private driveway.

It is an object of this invention to provide a novel lift and turntable which will satisfy the above described requirements.

Lifts for automobiles, which raise the entire automobile from the ground and upon which the automobile may be turned about, are well known in service station use. Such lifts and turntables are satisfactory for commercial use but are beyond the range of commercial availability for the automobile owner interested only in a lift and turntable for handling his own car. It is an object of this invention to provide a novel lift and turntable which is characterized by simple and inexpensive construction and which is adequately strong and durable for the functions which it is intended to perform.

Commercial lifts for automobiles involve considerable equipment for their operation and must be operated by trained service men. Obviously, a lift and turntable adapted for private use should be such as requires only the simplest of manipulation to set it into operation and cause it to perform its functions. It is an object of this invention to provide a novel lift and turntable having the structure and mode of operation such that it may be set into operation and will carry through a complete cycle of its operations by the simple manipulation of a lever, foot pedal, or switch. It is an object of this invention to provide a novel lift and turntable which will operate upon the manipulation of a single instrumentality to raise an automobile from the ground, to turn the automobile about, to lower the automobile to the ground, and to return itself to non-operating position.

A great many of the instances, when there is occasion for the use of an automobile lift and turntable, occur at the home or at some other particular location. It is an object of this invention to provide an automobile lift and turntable which may be installed as a unit at some particular location. However, there are many instances when it is desirable to have a lift and turntable with the automobile at all times, to be used at the driver's convenience. It is an object of this invention to provide a novel lift and turntable mounted in combination with an automobile and adapted to be carried with the automobile and to be put into use as desired. It is an object of this invention to provide a novel lift and turntable and means combined with an automobile adapted for raising and lowering the lift as a unit to and from the automobile, and adapted to support the automobile from the lift when the lift is being operated, to raise the automobile, and to turn the automobile.

Other objects and advantages of the present invention will appear in the following detailed description taken in connection with the accompanying drawings in which Figure 1 is a view in cross section of the lift and turntable of this invention.

Figure 7:
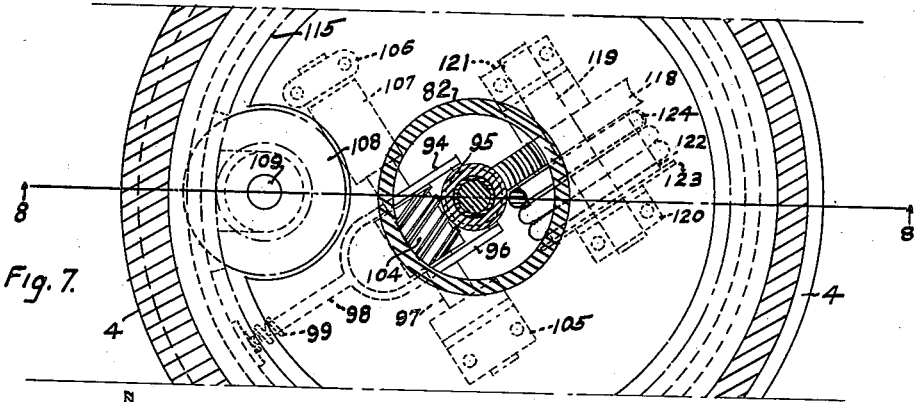
Figure 7 is a cross sectional view, taken on line 7—7 of Figure 8, illustrating a mechanism for operating the lift of a modified form of my invention.
Figure 9:
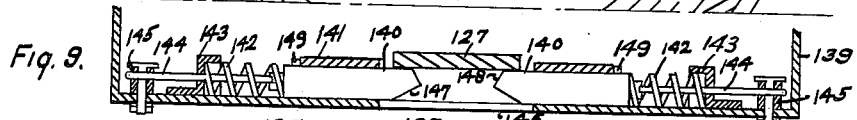
Figure 8:
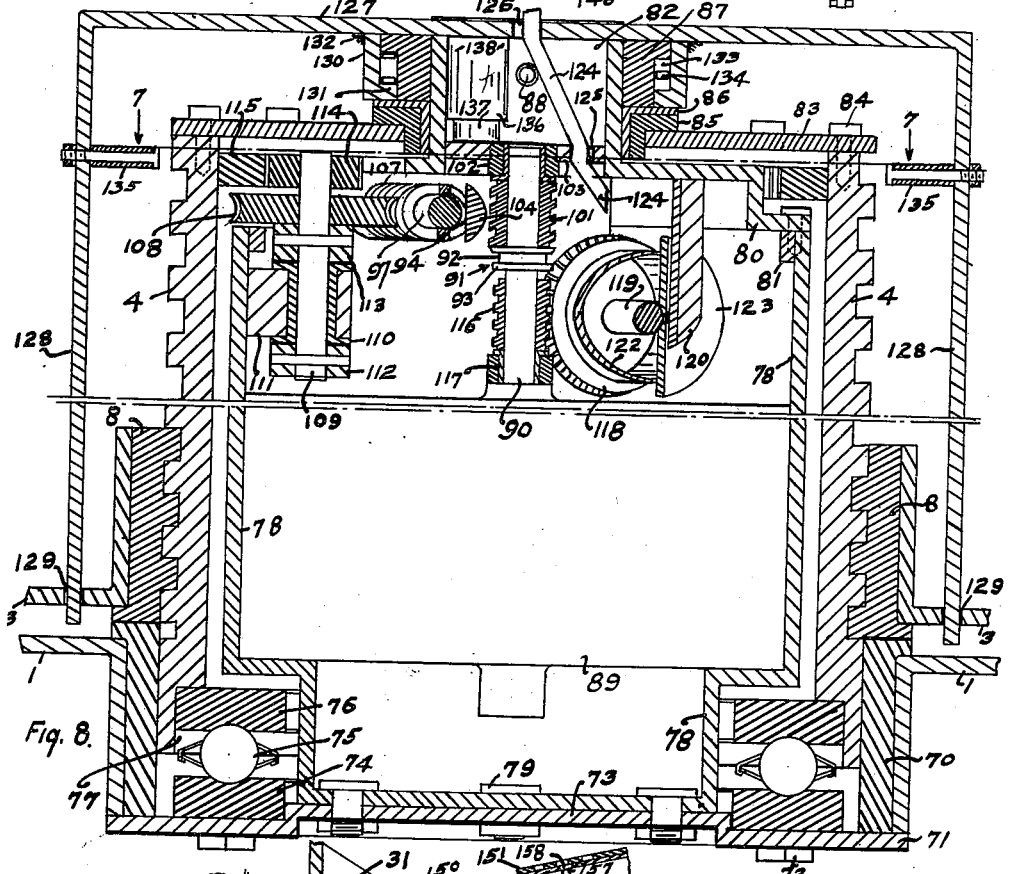
Figure 8 is a vertical cross sectional view, taken on line 8—8 of Figure 7.
Figures 10, 11:
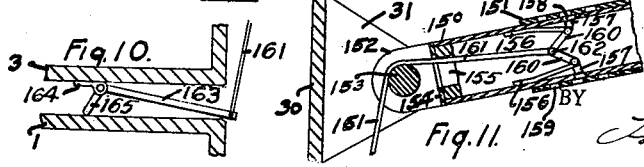

Figures 9, 10, and 11, are views, in cross section, of details of the invention as embodied in Figures 7 and 8.

Figure 12:
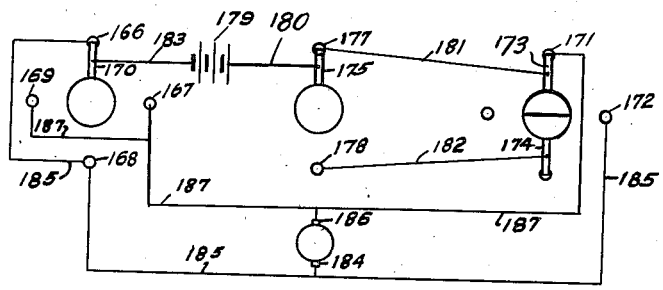
Figure 13:
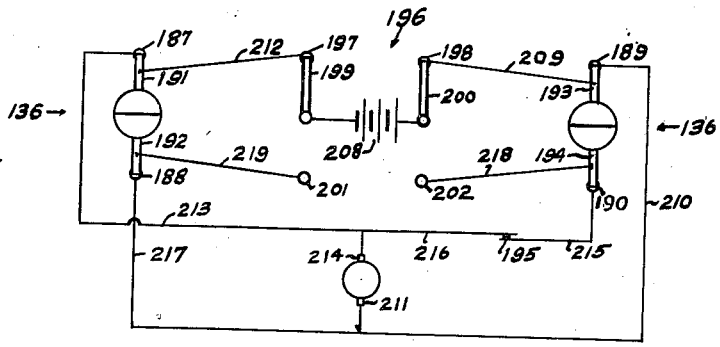

Figures 12 and 13 are circuit diagrams showing electrical connections for operating the device of Figures 7 and 8.

The lift and turntable of this invention is provided with a base 1 adapted to rest freely upon the ground or pavement as indicated at 2. In that form of the invention wherein the lift and turntable is mounted for transportation with the automobile, the base 1 is arranged to rest freely upon the ground or pavement so that it may be lifted at any time. In that form of the invention wherein the device is intended to be fixed in a place, as a driveway unit, for example, the base 1 may be embedded in the ground or in concrete as desired.

Figure 1:
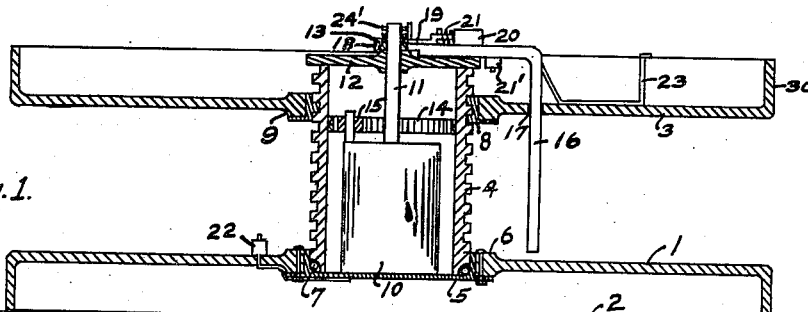

In the interest of economy of manufacture and in order to keep the weight of the device at a minimum, the base 1 may be made on comparatively thin sheet metal formed to provide a maximum of rigidity and strength. For example, the base 1 may consist of the hub engaging portion, the spoke portion, and the rim engaging portion of a disk or pressed sheet metal automobile wheel. Such a structure is adequately strong and light, and is comparatively inexpensive. The device of this invention is provided with a top plate 3, adapted to engage or to be connected with axles or frame of an automobile. The requirements of strength and rigidity of top plate 3 are similar to those of base 1; and in the interests of economy of manufacture, the top plate 3 is standard with the base 1, the top plate being arranged upside down relative to the base 1, as shown in Figure 1. The connections between the top plate 3 and the automobile frame will be described later.

The load of the automobile, received by the top plate 3, must be transferred to the base 1 and means must be provided for raising the loaded top plate 3 relative to the base 1. According to this invention, a hollow screw 4 is arranged to be supported on and within bearing plate 5, mounted on the hub 6 of base 1. Anti-friction bearings 7 are arranged between the screw 4 and the bearing plate 5. The margin of the screw end extends within the margin of bearing plate 5, there being lateral engagement therebetween which affords lateral support for the lower end of screw 4. A nut 8 is threaded on the screw 4 and is fixed into hub 9 of top plate 3; hub 6 of base 1 and hub 9 of top plate 3 being similar in all respects. An electrical motor 10 is fixed to the bearing plate 5 and is arranged within the hollow screw 4. A post 11 rigid with bearing plate 5 or with the motor housing extends axially of screw 4 and through a central aperture in cap plate 12. Cap plate 12 is fixed upon the top of screw 4 and turns about the post 11 as the screw 4 turns. The bearing between the aperture in cap plate 12 and the post 11 supports the top of the screw 4 against lateral displacement. A collar 13 is fixed on the post 11 and engages the cap plate 12 on the side distant from the interior of screw 4. The collar 13 secures the screw 4 in place on the bearing plate 5. Thus screw 4 is securely mounted on the base 1 and supported against both vertical and lateral displacement relative to the base 1, while being mounted for rotation about a vertical axis relative to the base 1.

The screw 4 is fitted with the internal gear 14, engaged by spur gear 15, driven from the motor 10. Operation of the motor 10 turns the screw 4 relative to the base plate 1. A radius arm 16 extends through an aperture 17, formed in the top plate 3 and the radius arm 16 is provided with a hub 18 journalled on the collar 13. A latch 19 carried upon the radius arm 16 is adapted to engage a slot 20' in the collar 13. When the latch 19 is engaged with the slot in collar 13, the radius arm 16 is held against rotation relative to base 1 by the rigid post 11. The engagement between the radius arm 16 and top plate 3 at the aperture 17 holds the top plate 3 against rotation relative to base 1 so long as the latch 19 remains engaged. Non-rotation of top plate 3, and the nut 8 fixed to the top plate, during operation of screw 4 by motor 10, causes the nut 8 to travel along the screw 4. The motor 10 is reversible to drive the screw 4 in either direction of rotation and thereby to cause the nut 8 and top plate 3 to travel either up or down the screw 4. A solenoid 20 is mounted upon the radius arm 16 in operative association with the latch 19 so as to withdraw the latch 19 from engaged position upon energization of the solenoid. A spring 21 is provided for returning the latch to engaged position and holding it there so long as the solenoid is not energized.

Upon withdrawing the latch 19, the radius arm 16 becomes freely rotatable about collar 13 and post 11 relative to the base 1. The driving force of the motor exerted through screw 4 upon the nut 8 tends to turn top plate 3 relative to the base 1. When the latch 19 is released, freeing the top plate for rotation, the motor 10 operates to turn the automobile about the vertical axis of screw 4. Inasmuch as the friction between the nut 8 and screw 4 is large compared to the friction at the bearing 7, the nut 8 and plate 3 turn with the screw 4 on the bearing 7. Should the automobile strike an obstruction while turning, the result would be only that the nut 8 would begin to travel up or down the screw 4. If desired, when the automobile has been lifted to clear the ground, the motor 10 may be stopped and the automobile may be turned by hand. The turning movement of the automobile by hand may be effected by withdrawing the latch 19. If the gear train between the motor and the internal gear 14 does not involve a worm drive, rotation will take place at bearing 7, the screw turning with the nut. The result is that the motor is driven by the turning movement of the automobile and the screw 4 turns with the top plate 3 on the bearing 7. If the gear train involves a worm drive, the screw will be held against rotation relative to the base. Manual rotation of the car will cause rotation of the nut on the screw, with travel either up or down the screw.

Figures 4, 5, 6:
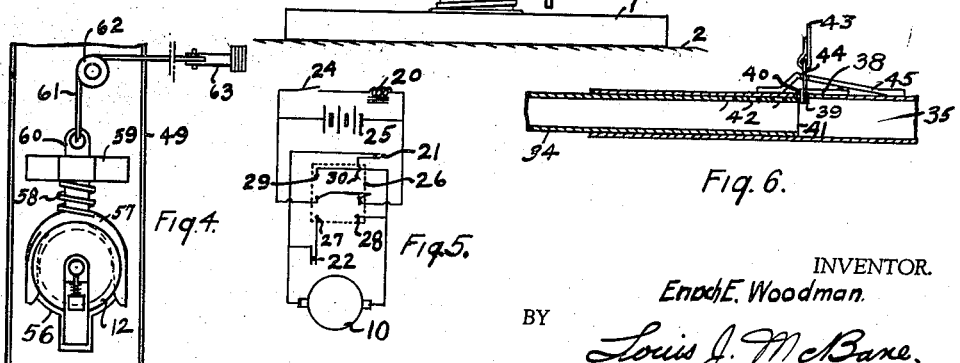
Figure 4 is a view, in plan, of a detail of the invention, illustrating the structure for supporting the lift, when in raised position, upon the automobile frame.
Figure 5 is a diagrammatic view of an electrical circuit for operating the lift and turntable of Figures 1, 2, and 3.
Figure 6 is a detailed view in cross section of the means for connecting the lift to the automobile frame.

The rotation of top plate 3 and the automobile carried thereby may be in either direction of rotation whether that turning movement be effected manually or by operation of motor 10. A limit switch 21' may be mounted upon the radius arm 16 to be engaged by the hub of top plate 3 as the top plate nears the upward limit of its movement. The limit switch 21' operates to cut out the motor and thus prevent damage to the device. A similar limit switch 22 is mounted on the base 1 and is adapted to be engaged by the top plate 3 when the latter approaches the lower limit of its travel. Limit switch 22 operates to cut the motor out and prevent damage to the unit. Electrical cable 23 may extend from the battery of the automobile to slip rings 24' electrically connected with motor 10. An electrical circuit for operating the unit 1 is shown in Figure 5. The solenoid 20 is connected in a series with switch 24 across the source of power 25. Switch 24 may be arranged conveniently in the operator's compartment of the automobile and may be operated at anytime. A double pole double throw switch 26 is connected across the battery 25. Switch points 27 and 28 are connected with the brushes engaging the motor commutator. Switch points 29 and 30 are connected with the brushes of the commutator reversely with respect to the connections leading from switch points 27 and 28. Operation of switch 26 in one direction of throw will drive the motor in one direction of rotation while operation of switch 26 in the other direction of throw will operate the motor in the reverse direction. Limit switch 21' is connected in a series between the switch point 30 and a motor brush. Limit switch 22 is connected in a series between switch contact 27 and a motor brush.

Assuming that the top plate 3 is in lowered position where limit switch 22 is open, the switch 26 being left in position for engagement with points 27 and 28, upon throwing the switch 27 to the position where points 29 and 30 are engaged, the motor 10 is set into operation in a direction such as to cause the nut 8 to travel up the screw 4, the switch 24 being open so that the radius arm 16 prevents rotation of top plate 3 relative to base 1. At anytime during the upward travel of nut 8 on the screw 4, after the automobile has been lifted from the ground, the switch 24 may be operated manually to release the latch 19 and cause the automobile to turn about a vertical axis. Actuation of switch 24 withdraws the latch 19 and allows the turning movement to begin. Immediate reopening of switch 24 will cause the latch 19 to be thrust into the next notch by the spring when the automobile has completed a predetermined fraction of a revolution, 180° for example (the collar 13 has at least two notches, spaced 180° apart, and may have a larger number of notches regularly spaced if desired). Actuation of switch 24 may occur while the motor 10 continues to operate, or the motor 10 may be stopped and the switch 24 actuated to withdraw the latch 19, whereupon the motor 10 may be driven in either direction of rotation to turn the automobile about the vertical axis. Or, switch 26 may be thrown out of engagement with either set of contacts and the automobile turned manually after actuation of switch 24 to release the latch 19. If the top plate 3 travels to the top of screw 4, the limit switch 21 will be opened to prevent further operation of the motor in that direction of rotation. Reversal of switch 26 will cause the motor 10 to reverse the direction of rotation and to move the top plate 3 down the screw 4.

Figure 2:
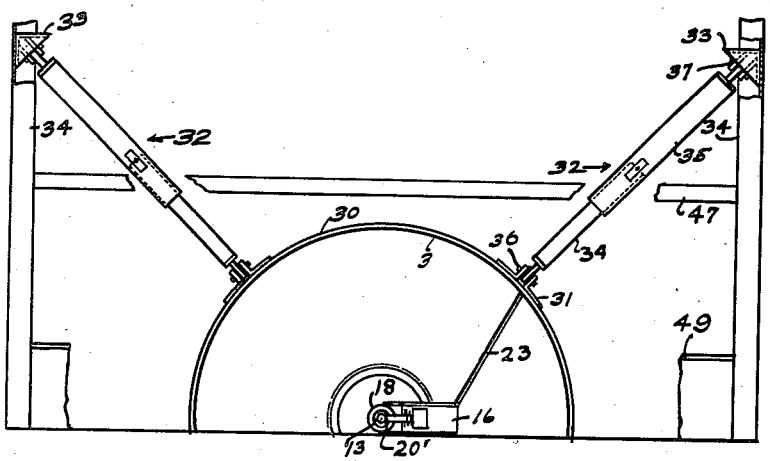
Figure 2 is a partial plan view of the unit of Figure 1, combined with means for mounting the unit on the automobile frame.
Figure 3:
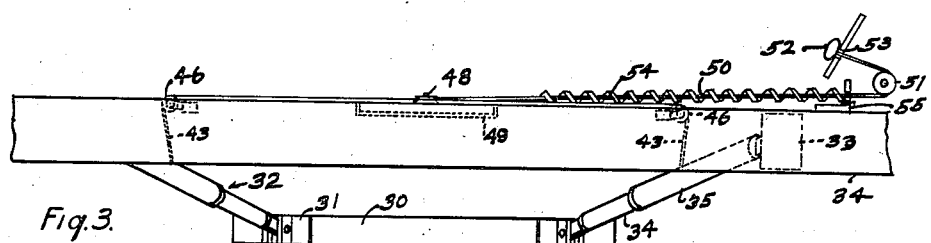
Figure 3 is a side elevation illustrating the lift and turntable mounted upon an automobile and means for raising and lowering the unit relative to the automobile frame.

So far, the structure of the lift and turntable has been described. The manner of association of the turntable with the automobile will be described next. A structure is illustrated in Figures 2 and 3 for connecting the lift and turntable with the automobile frame, the lift and turntable to be carried with the automobile at all times. The top plate 3 has the upturned margin 30 to which brackets 31 are attached in any suitable conventional manner. The brackets 31 are arranged in pairs at 90° intervals about the margin 30. Collapsible connections 32 extend from the brackets 31 to brackets 33 fastened to the side frame members 34 of the automobile. The particular construction and arrangement of the collapsible connections 32 may be varied within the scope of this invention and may include, for example, bars pivoted at their ends to brackets 31 and 33 and connected by a hinge at their juxtaposed ends so as to form an elbow-like joint which may be straightened to a position where the bars form a stiff load bearing compression member. One suitable form of collapsible member 32 is illustrated in Figures 2, 3, and 6, and consists of tubes 34 and 35 arranged in telescoping relation. The tube 34 is pivoted as indicated at 36 to a pair of brackets 31 and the tube 35 is pivoted to a bracket 33, as indicated at 37. The tube 35 is provided with a leaf spring 38 fastened on the outside wall thereof. The leaf spring 38 carries a laterally extending projection 39 arranged to extend through an aperture 40 in the side wall of tube 35. When the projection 39 extends within the tube 35, it may engage the end 41 of tube 34 or any one of the apertures 42 provided in the wall of tube 34. The projection 39 may be withdrawn from engagement with any part of tube 34 by a cable 43 connected with pin 44 attached to the projection 39. A bracket 45 is mounted upon the tube 35 to limit the displacement of leaf spring 38 under the tension exerted through cable 43 on projection 39.

As shown in Figure 3, the cables 43 are trained over pulleys 46, supported upon cross bars 47, extending between the side frames 34 of the automobile. The cables lead to a central pulley 48 rotatably mounted upon cross member 49 extending between side members 34 of the automobile. The cables 43 connect with a common cable 50 which is trained over pulley 51 and leads to a handle 52 arranged in the operator's compartment of the automobile, the cable 50 extending through an aperture 53 in the floor board. A tension spring 54 connects at one end with cable 50 and at the other end with a bracket 55 fixed upon the automobile frame.

When the lift and turntable is in raised position, where it is carried during travel of the automobile, the cap plate 12 extends through an aperture 56 in cross member 49, see Figure 4. The aperture 56 is of a shape to accommodate the radius arm 16, as shown in Figure 4. A yoke 57 is mounted for lateral sliding movement along cross member 49, and a spring 58 is arranged to engage the yoke at one end and to engage a bracket 59 at the other end. A shaft 60 of the yoke is guided by bracket 59. A cable 61 connects with the shaft 60, is trained about pulley 62, rotatably mounted on the cross member 49, and leads to a pedal 63 arranged in the operator's compartment. When the lift and turntable is arranged in uppermost position, the yoke 57 extends beneath the margin of cap plate 12, as illustrated in Figure 4, and supports the lift during travel of the automobile. When it is desired to make use of the lift and turntable, the pedal 63 is operated to withdraw the yoke 57 against the force of spring 58 and thus to release the cap plate 12 of the lift. The lift moves downwardly toward the ground by its own weight. The spring 54 acting on cable 50 and cables 43, resists the downward movement of the lift and allows it to fall at a safe speed. The blade springs are held against the brackets 45 by the tension exerted on cables 43 by the falling lift, see Figure 6. When the lift and turntable reaches the ground, the force exerted by the weight of the falling lift being relieved, the leaf springs 38 overcome the force of spring 50 and press the projections 39 into place in the apertures 40 in tubes 35. This positions the projections 39 for engagement by the tubes 34. At the time the lift is dropped to the ground, the base 1 and the top plate 3 are juxtaposed. When the motor 10 is set into operation to drive the lift in the manner described above, the first movement of top plate 3 relative to base 1 takes up the play in the collapsible members 32 and causes the ends 41 of tubes 34, or the side wall at apertures 42 in tube 34, to engage the projections 39. Then the collapsible members 32 act as rigid load bearing compression members for supporting the car on the top plate 3. The brackets 33 are arranged on the automobile frame so that when the automobile is lifted, it will be approximately in balance and will rise without substantially tilting to either side or at either end. The lift is driven through a cycle of operations described above, to raise the automobile above the ground where it may be serviced and returned to the ground, or where it may be turned about a vertical axis to another position and returned to the ground. The dash line 64 indicates the level of the wheels as indicated in Figure 3. When the automobile is returned to the ground, and it is desired to return the lift to traveling position, handle 52 is pulled by the operator, applying tension through the cable 50 to cables 43 tending to raise the lift. The pull exerted by the operator is assisted by spring 50. The first action of the pull exerted by the operator is to retract the projections 39 out of engaged position, thereby releasing collapsible members 32 so that the tubes 34 and 35 may telescope. The leaf springs 38 flex until supported by the brackets 45 when the combined force exerted by the operator and the spring 50 raises the lift from the ground to a position where the cap plate 12 moves through the aperture 56 in cross member 49. Upon releasing pedal 63, spring 58 moves the yoke 57 into position underneath the cap plate and when the operator releases the handle 52, the lift will be supported by yoke 57 and cross member 49 in travelling position.

The device shown in Figures 1 to 6 and described above requires considerable manual manipulation to effect its operation. Another form of the invention essentially automatic in its operation is illustrated in Figures 7 to 11. The base 1, the top plate 3, screw 4, and the nut 8 are essentially the same as those illustrated in Figures 1, 2, and 3. A bushing 70 is pressed in the central portion of base 1. A base plate 71 is arranged across the bottom of the central opening of base 1 and is secured in place by bolts 72 threaded into the bushing 70. The base plate 71 is made with a centrally raised portion 73 adapted to fit within a race 74 of the ball bearing 75 so as to position the race 74 and to hold it securely in place. The other race 76 of the bearing is pressed into recess 77 in the end of screw 4. The ball bearing 75 affords vertical support and freely running bearing for the screw 4. The lateral engagement between the margin of screw 4 and the bushing 70 affords lateral support for the screw at that end. A housing 78 is secured to base plate 71 by bolts 79. A cover plate 80 is bolted to the top of the housing 78, a ring 81, pressed in place, being provided at the upper margin of the housing 78 for adequate screw connection. The cover plate 80 has, integral therewith, hollow post 82 extending axially of screw 4. A cap plate 83 is secured to the screw 4 by bolts 84 and is provided with a collar 85 pressed in a central aperture in cap plate 83. Collar 85 is fitted with bushing 86 through which the post 82 extends in running engagement. A collar 87 is removably fixed on the hollow post 82 by a suitable means such as a pin 88. The face of collar 87 engages the bushing 86 with a running fit. The bushing 86, fixed in cap plate 83, together with post 82 and collar 87, afford bearing support for the screw 4 against lateral displacement and against displacement in a vertical direction away from the base. If desired, the collar 87 may be threaded on the post 82 and may be adjusted as desired to afford a close running fit at the bushing 86 and at the ball bearing 75 so as to support the screw 4 without vibration or chattering.

An electric motor 89 is mounted in, or may be a part of, the housing 78. The shaft of the motor is indicated at 90. The motor is reversible.

A friction clutch 91 is splined on the shaft 90 so as to be carried in rotation therewith but to be free for longitudinal movement on the shaft. The clutch 91 is provided with friction faces at both ends and with a circumferential recess 92 extending there-around between the end shoulders 93. A yoke 94 has projections 95 arranged to extend into the recess 92. The yoke is provided with apertures, not shown, in the arms 96 through which a shaft 97 extends. The fit of the apertures in the arms 96, of yoke 94, on the shaft 97 is such that the shaft 97 and the yoke 94 each may turn without interfering with turning movement of the other. The yoke 94 has stem 98 to which is attached a compression spring 99. The other end of spring 99 engages an abutment 100 mounted on the side wall of the housing 78. The spring 99 is arranged so that its axis is directed toward the axis of rotation of the yoke, about the shaft 97, when the clutch 91 is in an intermediate position. The spring 99 acts as a toggle and when the clutch 91 is thrown in either of two extreme positions, it is held to that position by the spring 99. It will be observed that the leverage of spring 99 about the axis of rotation of yoke 94 is large compared to the leverage exerted between the pins 95 and that axis of rotation. Accordingly, a small powerful spring 99 affords a large force for maintaining the clutch 91 in either of its extreme positions and for providing adequate clutch engaging force.

A spiral gear 101 is mounted on the shaft 90 with a running fit. One end of the spiral gear 101 is adapted to be engaged by the clutch 91, in one of the two operating positions of the clutch, and a bearing 102 is provided both for receiving the end thrust of the spiral gear 101 and for rotatably supporting the end of the shaft 90. The bearing 102 is fixed in a plate 103, pressed into the hollow post 82. Spiral gear 101 meshes with a like gear 104 fixed upon the shaft 97. Shaft 97 is mounted for rotation in bearings 105 and 106, fastened to the underside of cover plate 80. A worm 107 is fixed to shaft 97 and is arranged to drive worm gear 108 fixed on shaft 109. Shaft 109 is supported for rotation, and against endwise movement, by a bushing 110 mounted in bearing block 111, fastened to the sidewall of the housing 78. Collar 112 and collar 113 of the worm gear 108 are pinned to the shaft 109 and engage the bushing 110 to prevent endwise movement of stub shaft 109. A spur gear 114 is fastened onto the end of stub shaft 109 and is arranged in mesh with internal gear 115, pressed into the hollow screw 4 near one end thereof. The above described gear train affords a drive from the motor 89 to the screw 4 in either direction of rotation and at a suitable speed for raising the automobile.

A worm 116 is mounted on the shaft 90 with a running fit and is arranged to be engaged, at one end, by the clutch 91, and to bear against the bushing 117 of the motor shaft bearing, at its other end. The worm 116 is arranged in engagement with worm gear 118 fixed on shaft 119 which is mounted for rotation in bearings 120 and 121 fixed on and depending from the cover plate 80. The worm gear 118 serves as one head for a drum 122, the other head of the drum being indicated at 123 and being fixed upon the shaft 119. A cable 124 has one end connected with the drum 122 and is adapted to be wound and unwound on the drum. In Figure 7, the cable is shown partly wound on the drum 122. Cable 124 extends from the drum 122 through an opening 125 provided in the insert plate 103. The cable also passes through another aperture 126 in a cross-beam 127, the opening 126 being axially arranged in respect to the screw 4. The cable 124 is fastened to the frame of the automobile in any suitable manner, not shown.

Cross beam 127 has depending legs 128 arranged to extend through apertures 129 in the top plate 3. The cross beam 127 is provided to prevent rotation of top plate 3 relative to the base 1, when the nut 8 is traveling along screw 4 under the power of the motor 89. The cross beam 127 extends across the hollow post 82 and the top of post 82 is slotted to seat the cross beam 127 therein. The cross beam 127 is shown in seated position in the post 82 in Figure 8. A short tube 130, having an inturned flange 131, is fastened to the cross beam 127 in any suitable manner as by welding, indicated at 132. The tube 130 is arranged in sliding engagement with the collar 87, there being a space 133 between the tube and collar and between the flanges of the tube and the collar. A spring 134 is arranged in the space 133 and urges the cross beam 127 in a downward direction, as viewed in Figure 8, toward slot engaging position. The structure shown in Figure 8 involves the cross beam 127, the tube 130, and the collar 87 as a unit, the collar 130 being welded to the cross beam 127 after the spring 134 is arranged in place and the tube 130 assembled on the collar 87. Other suitable structure may be provided permitting disassembly of collar 87 and spring 134 from tube 130 and cross beam 127, if desired. The legs 128 of cross beam 127 are provided with abutments 135 extending laterally therefrom and being arranged to be engaged by the top of nut 8 as the latter approaches the uppermost position. Engagement of nut 8 with abutments 135 operates to lift the cross beam 127 upwardly, as viewed in Figure 8, against the resistance of spring 134, and to raise the cross beam 127 clear of the slot in the end of post 82.

An electrical switch 136 is arranged to be operated whenever the cross beam 127 is lifted relative to the associated elements. The switch 136 may be located in various suitable combinations with the other elements, one arrangement being illustrated in Figure 8 where it is within the hollow post 82 and is arranged with one end abutting the underside of cross beam 127 and the other end of the switch abutting the insert plate 103. The electrical switch has telescoping parts 137 and 138 pressed apart by a suitable spring, not shown, so as to cause actuation of the switch 136 when the cross beam 127 is raised relative to the post 82; the spring for operating switch 136 is weak compared to the strength of spring 134 so that movement of the cross beam 127 will be under the control of spring 134.

A structure for supporting the unit illustrated in Figures 7 and 8 when the latter is in raised position beneath the automobile and ready for transportation therewith, is illustrated in Figure 9. A cross channel 139 extends between the side frames of the automobile. Pawls 140 are mounted on the cross member 139 for sliding movement, being guided and held in place by brackets 141 fixed to the cross plate 139. Compression springs 142 engage, at one end, the pawls 140 and at the other end, with brackets 143, also fastened to the cross member 139. Cables 144 connect with pawls 140 and extend about pulleys 145 mounted on the cross member 139. The cables 144 lead to a common cable which in turn leads to a foot pedal or other suitable operating means in the operator's compartment of the automobile. The structure illustrated in Figure 4 for operating the yoke 57, of the form of invention illustrated in Figures 1 to 6, is suitable for the operation of pawls 140. An opening is provided in the cross member 139 and is of a size and shape to pass the cross beam 127 as well as the tube 130. Upward movement of cross beam 127 through the opening 146 causes the pawls 140 to move backward by engagement of cross beam 127 with inclined faces 147 on pawls 140. As soon as the cross beam 127 has passed a central position relative to the pawls 140, the pawls 140 are urged back into place by springs 142. The sloping surfaces 148 then engage the cross beam 127 and lift it relative to the post 82 so as to actuate the switch 136. The stroke of the pawls 140 is limited by stop pins 149 on each pawl, which pins engage the brackets 141.

The top plate 3 has a margin 30, as in Figures 1, 2, and 3, see Figures 10 and 11. Brackets 31 are mounted on the edge 30 of the top plate 3 at several points about the circumference, as illustrated in Figure 3. Telescoping tubes 150 and 151 compose the collapsible elements by which the top plate 3 is connected with frame of the automobile, in the same manner, as illustrated in Figures 2 and 3. Tubes 150 are provided with bifurcated extensions 152 pivoted upon pins 153 carried in frames 31. Extensions 152 are connected to tubes 150 by collars 154 having apertures 155 there through. Leaf springs 156 are mounted internally of tubes 150. Each leaf spring carries a projection 157 adapted to extend through apertures 158 in the tube wall and to engage with apertures 159 in tube 151. When the projections 157 are in engaged position, they prevent relative telescoping movement of the tubes 150 and 151 and form a rigid compression load bearing member for supporting the automobile from the top plate 3. Links 160 are pivoted to leaf springs 156 adjacent to the projections 157. The links 160 are pivoted together and joined to cable 161 at the point 162. The cable 161 extends from links 160 through aperture 155, between the bifurcations of extension 152, and over the pin 153. The cable 161 is connected with the end of bell crank lever 163. The bell crank lever 163 is pivoted on bracket 164, fastened to the top plate 3. The arm 165 of bell crank 163 is arranged to be engaged by the base 1 as the top plate 3 approaches its lowermost limit of movement toward the base 1. Engagement of arm 165 with base 1 rotates the bell crank 163 in a clock-wise direction, to the position shown in Figure 10, and pulls the cable over the pin 153 to move the links 160, the projections 157, and the leaf springs 156 to retracted position, which is illustrated in Figure 11. When top plate 3 moves away from base 1, freeing the bell crank 163 for rotation about pivot 164, the leaf springs 156 operate to move projections 157 into engagement with apertures 159 in tube 151.

An electrical circuit for the device of Figures 7 and 8 is shown in Figure 12. The switch 136 is constructed and arranged for rotary movement of the switch blades through 90 degrees with a snap action at the end of the stroke, when the telescoping parts 137 and 138 of the switch separate. The switch 136 is indicated diagrammatically in Figure 12, as consisting of contact points 166, 167, 168, and 169, adapted to be engaged successively by rotatable switch blade 170. The switch 136 also has contacts 171 and 172 arranged for engagement by switch blade 173 and switch blade 174. The switch blades 173 and 174 are electrically insulated from one another. A switch 175, conveniently arranged in the operator's compartment of the automobile, is provided for manual manipulation to set the device into operation. If desired, the switch 175 may be arranged for actuation by the foot pedal, or other instrumentality provided for actuating cables 144 and pawls 140.

The switch 175 has two positions of operation where the blade of switch 175 engages contacts 177 and 178. Successive operation of switch 175 moves it from contact 177 to contact 178 and vice versa. The source of electrical power 179 is connected with switch 175 by conductor 180, and contacts 177 and 178 are connected with switch blades 173 and 174 by conductors 181 and 182 respectively. The battery 179 is connected with switch blade 170 by conductor 183. Switch points 166, 168, and 172 are joined and connected to brush 184, of the motor, by a conductor system 185. Contacts 167, 169, and 171 are connected with motor brush 186 by conductor system 187.

The operation is as follows: With the lift in raised position and supported by the pawls 140 on the cross member 139, the foot pedal, such as indicated at 63 in Figure 4, is actuated to withdraw the pawls 140 from beneath the cross beam 127, the switch blade 175 being moved into engagement with contact 177 by the actuation of the foot pedal. Switch blades 170, 173, and 174 of switch 136 are in the position illustrated in Figure 12. The motor 89 is connected with the source of power by the following circuit: Conductor 180, switch blade 175, contact point 177, conductor 181, switch blade 173, contact 171, conductor 187, brush 186, brush 184, conductor 185, contact point 166, switch blade 170, conductor 183, back to the source of power. At this time, the yoke 94 is in a position such as to engage clutch 91 with worm 116.

The motor 89 operates to drive the worm 116 through clutch 91. The worm 116 drives the worm gear 118 in a direction to unwind the cable. The thread of the worm 116 is such that, when turning to unwind the cable, the thrust is upwardly directed, as viewed in Figure 8. However, the tension on the cable, due to the weight of the lift, exerts a torque on the drum 122 and the worm gear 118 in a direction such as to counteract the end thrust of the worm 116. This force and the force of spring 99, is adequate to hold the worm against bearing 117. The cable 124 unwinds until the base 1 rests on the ground and, a slight amount of slack being provided in the cable 124, the cable begins to re-wind in the opposite direction on the drum 122. When the weight of the lift again tensions the cable, the resulting torque on the worm gear 118 is in a direction co-acting with the end thrust of the worm 116. The combined forces are adequate to overcome spring 99 and to throw clutch 91 through dead center position. This action disengages clutch 91 from worm 116 and discontinues the drive of drum 122. The action also throws clutch 91 into engagement with the spiral gear 101.

The motor continues its operation in the same direction of rotation at the time the clutch is thrown from worm 116 to spiral gear 101 and rotation of spiral gear 101, ensues. Rotation of spiral gear 101 drives spiral gear 104, worm 107, worm gear 108, spur gear 114, and internal gear 115 to rotate the screw 4. The thread of the spiral gear 101 is such that its rotation develops an end thrust upwardly directed, as viewed in Figure 8, which end thrust is received by bearing 102. At this time, the force of spring 99 is utilized only to maintain the clutch 91 in driving engagement with the spiral gear 101. The consequent rotation of screw 4 is in a direction to cause nut 8 to travel up the screw.

The initial upward movement of the nut 8, and top plate 3, permits bell crank 163 to pivot. The leaf springs 156 then press the projections 157 into engaging position. The projections enter slots 159, or are engaged by end of tube 151, as the tubes telescope slightly with operation of the lift. As soon as the projections become seated, the tubes 150 and 151 become rigid compression members which support the car from the top plate 3, as it is lifted.

As the nut 8 approaches the uppermost position, abutments 135 are engaged and further upward movement of nut 8 raises the cross beam 127 clear of the recess in the post 82. The movement of cross beam 127 relative to the post 82 causes actuation of switch 136 and, at the end of the stroke of the switch, it snaps so as to turn switch blade 170 into engagement with switch point 167, and switch blade 173 into contact with switch point 172; switch blade 174 is rigid with respect to switch blade 173 and the two switch blades move in unison.

The last described actuation of switch 136 reverses the direction of rotation of the motor 89, as will be apparent from the circuit diagram of Figure 12. The cross beam 127 being clear of post 82, the top plate 3, and the automobile supported therefrom, is free to turn about the vertical axis of screw 4 upon the bearing 75. As the turning movement of the car begins, the inertia of the car tends to hold the nut 8 against rotation so that such movement of screw 4 relative to the nut 8 will occur as is necessary to overcome the inertia of the automobile to turning movement. Since the direction of rotation of the motor 89 and of the screw 4 was reversed at the time switch 136 was actuated, turning movement of screw 4 relative to nut 8, during initiation of car rotation, causes the nut 8 to travel down the screw 4 slightly. This movement partially releases the cross beam 127 from engagement with abutments 135 so that the spring 134 becomes effective for returning the cross beam into engagement with the notch in the post 82. The cross beam 127 having been turned from register with the slot in post 82, the cross beam rides on the top of post 82 until the car and the top plate 3 has been turned through 180 degrees when the spring 134 will move the cross beam 127 into the slot in the post 82 and stop further rotation of the automobile.

The operation of the motor continues after the automobile has been turned through 180 degrees and the cross beam 127 re-engaged in the recess at the top of post 82. The cross beam 127 prevents further rotation of nut 8 and continued operation of screw 4 causes nut 8 to travel down the screw 4.

As the nut 8 and top plate 3 approach the lowermost position, bell crank arm 165 engages with the base 1 to rotate the bell crank 163, thereby drawing cable 161 toward the left, as viewed in Figure 11, which action withdraws the projections 157 from engaged position and releases the tubes 150 and 151 for telescoping movement.

When the nut 8 reaches its bottom position and engages with the top of bushing 70, it jams and further rotation of screw 4 is prevented. During the downward travel of nut 8 on screw 4, the direction of rotation of the spiral gear 101, being the reverse of that when the nut 8 travels upwardly, is such that the end thrust of spiral gear 101 is exerted against the clutch 91, the spring 99 resisting that end thrust. Since the car is being lowered, the only driving force required is that necessary to overcome the friction between nut 8 and screw 4. The comparatively light load, together with the large gear reduction, imposes a comparatively light end thrust on spiral gear 101 so that the force of spring 99 is adequate to resist that thrust. When the nut 8 jams against the bushing 70, end thrust of the spiral gear 101 immediately increases to the point where the clutch 91 is moved downwardly and the yoke 94 is thrown past dead center position. This relieves the driving connection between the clutch 91 and the spiral gear 101 and renews the drive of worm 116 from the clutch.

The direction of rotation of worm 116 now is the reverse of that when the lift was being lowered with the result that the end thrust of the worm 116 is downwardly, as viewed in Figure 8, and is received by bearing 117. The worm 116 drives the worm gear 118 in a direction reverse to that during lowering movement. The cable 124 is rewound on the drum 122 and the lift is raised toward the automobile, tubes 150 and 151 telescoping together. The upward movement of the lift continues until the cross beam 127 engages the pawls 140, and moves those pawls backwardly until the center of the pawls is passed. Then the pawls 140, under the force of springs 142, are returned to original position, the sloping faces 148 of the pawls engaging beneath the cross beam 127 and raising it relative to the post 82 so as to again actuate the switch 136. The last mentioned actuation of the switch 136 causes rotation of switch blade 170 into engagement with switch point 168 and rotation of switch blades 173 and 174 so that switch blade 174 engages switch point 171 and switch blade 173 is free of engagement with any switch point. At this time, motor operation ceases, since the blade 176 of switch 175 is engaged with contact 177 and contact 177 is connected by conductor 181 with switch blade 173 which is out of contact with any switch point. The operating parts of the lift and turntable have been returned to the position occupied when the cycle of operations herein described began. At the time the blades of the switch 136 are in a position 180° removed from the initial position, it will be observed by referring to the circuit diagram of Figure 12 that movement of switch 175 to engage contact 178 will set the device into operation through another cycle like that before described. When the foot pedal, for releasing the pawls 140 is next actuated, switch blade 175 will be turned to engage switch point 178 and the same cycle of operations will be started and carried through as above described.

The invention has been described as a combination of lift and turntable with structure for mounting the lift and turntable on an automobile, the whole to be carried with the automobile at all times as it travels. It is also intended to include, within the purview of this invention, that form of lift and turntable adapted for use at a particular location, such as in a driveway, with suitable means for engaging either the axles or the frame of the automobile to raise it from the ground.

Any suitable framework having the requisite rigidity and strength, such as angle irons or I-beams, rigidly fastened to the top plate 3 and arranged to engage either the axles or the frame, or both, of the automobile in lifting it, may be provided for the stationary type of lift and turntable. Such structure is not illustrated in the drawings, it being well within the skill of the ordinary mechanic to devise and arrange conventional structure for that purpose. While, for the purpose merely of lifting and turning an automobile, a structure for receiving the automobile load from the wheels of the automobile, similar to the structure now found in service station use, may be provided for the stationary type of lift and turntable of this invention, it is desirable to provide such a superstructure or framework mounted on the top plate 3 of the stationary lift and turntable as will engage the car frame or axles so as to leave the wheels free for servicing when the automobile is clear of the ground.

The device illustrated in Figures 7 and 8, provided with the required superstructure mounted on the top plate 3 for engaging the automobile axles or frame, may, with modifications next to be described, be used as a stationary type of lift and turntable according to this invention. The device of Figures 7 and 8 may be modified by eliminating the drum 122, and its supporting structure, by eliminating the cable 124, by eliminating the worm 116, and by eliminating the clutch 91 and yoke 94 with associated parts. These changes involve the elimination only of those parts intended for raising and lowering the lift and turntable relative to the automobile, the structure for driving the screw 4 being left intact as shown. The spiral gear 101 may be fixed to the shaft 90 or a clutch, like clutch 91, may be provided but held in constant engagement with the spiral gear 101. Of course, the collapsible arms made up of tubes 150 and 151 are replaced by the rigid superstructure for engaging and disengaging the car frame or axles as the lift is operated. The modified device of Figures 7 and 8 is equipped with a limit switch located similarly to limit switch 22, Figure 1. A suitable electric circuit for the operation of the device of Figures 7 and 8 as the stationary lift and turntable is shown in Figure 13.

The switch 126 is shown in Figure 13 as having contact points 187, 188, 189, and 190. Contacts 187 and 188 are arranged to be engaged by switch blades 191 and 192, mechanically connected but electrically insulated from one another, and adapted to turn through 180° upon each actuation of switch 136. Contacts 189 and 190 are arranged to be engaged by switch blades 193 and 194 which are mechanically connected but electrically insulated from one another, and adapted to turn with switch blades 191 and 192.

A limit switch 195 is provided, in the position similar to that of switch 22 of Figure 1, where it is actuated when top plate 3 approaches base 1. Limit switch 195 is biased to closed position and is open only so long as it is engaged by top plate 3.

A manually operable switch 196 having contact pair 197 and 198, adapted to be engaged by blades 199 and 200, in one direction of throw of switch 196, and having contact pair 201 and 202, adapted to be engaged by blades 199 and 200, in the other direction of throw of the switch. The source of electrical energy, 208, is connected with switch blades 199 and 200.

In operating the stationary type of lift and turntable of Figures 7 and 8, modified as described, the automobile is driven over the device and located over the superstructure adapted to engage the car frame. At this time, the top plate is in lowermost position, switch 136 is in the position illustrated in Figure 13, and limit switch 195 is open. To set the device into operation, switch 196 is thrown to engage blades 199 and 200 with contacts 197 and 198. A circuit is completed as follows: From the source of power through blade 200, contact 198, conductor 209, blade 193, contact 189, conductor 210 to motor brush 211; and through blade 199, contact 197, conductor 212, blade 191, contact 187, conductor 213 to motor brush 214. This circuit drives the motor in a direction to raise the automobile. Operation of the motor continues until nut 8 engages abutments 135 and lifts cross beam 127 clear of the notch in post 82. This movement adjusts the device for turning the automobile about a vertical axis, and at the same time, operates the switch 136 through 180° so that blade 193 is moved into engagement with contact 190 and blade 191 is moved into engagement with contact 188. This operation of switch 136 completes the circuit as follows: From the source of power, through blade 200, contact 198, conductor 209, blade 193, contact 190, conductor 215, limit switch 195, conductor 216 to motor brush 214; and through switch blade 199, contact 197, conductor 212, switch blade 191, contact 188, conductor 217 to motor brush 211. This circuit reverses the direction of operation of the motor. The motor now operates in a direction to move the nut 8 down the screw and it will operate to turn the car to a predetermined angle, 180° in this instance, in the same manner as described hereinbefore with regard to the car attached lift. When the car has been turned through 180°, the cross beam 127 again engages the notch in post 82 and the nut travels down the screw 4 to lower the automobile to the ground. This operation of the motor continues until engagement of top plate 3 with limit switch 195 opens the circuit, stopping the motor.

When it is desired again to lift and turn the automobile, switch 196 is thrown in the other direction to engage blades 199 and 200 with contacts 201 and 202. The previous operation of the device left the switch 136 with blade 194 in engagement with contact 189 and with blade 192 in engagement with contact 187. Circuits are completed as follows: From the source of power, through blade 200, contact 202, conductor 218, blade 194, contact 189, conductor 210, to brush 211 of the motor; and through blade 199, contact 201, conductor 219, blade 192, contact 187, conductor 213 to brush 214. The motor is set into operation in a direction to raise the automobile. The lift operates to its uppermost position, automatically operates switch 136 to turn it to its original position, illustrated in Figure 13. Circuits are now completed as follows: From the source of power, through blade 200, contact 202, conductor 218, blade 194, contact 190, conductor 215, limit switch 195, conductor 216 to brush 214; and through blade 199, contact 201, conductor 219, blade 192, contact 188, conductor 217 to brush 211. The motor is reversed and operates to turn the car 180° and then to lower the automobile to the ground. Operation of the motor continues until the top plate 3 again engages limit switch 195 to open the circuit and stop the motor.

From the foregoing, it is apparent that by a single manipulation of switch 196, at any time, the automobile may be lifted from the ground, turned around, set down and the device returned to its initial position automatically. Anyone can operate the device.

It is intended that the device not only be automatic in its operation for lifting and turning an automobile but that the device be operable to lift the car up and down, with or without turning it, at the will of an operator for servicing it, or, in the instance of use of the device in garages or parking lots for facility in handling the automobile. It will be observed that at any point in the cycle of operation, as described above in connection with Figure 13, the switch 196 may be operated in the other direction of throw to reverse the motor and thus, to recede in the cycle. For example, if it is desired merely to raise the automobile to service it, and then to lower it without turning it about, the following course is pursued. With switch 136 as illustrated in Figure 13, limit switch 195 open, switch 196 is thrown to engage contacts 197 and 198. This sets the motor into operation by circuits before described to raise the automobile. At any time before the lift reaches the uppermost position, the operator may open the switch 196 and stop the lift, the car remaining in raised position. The operator may service the automobile and then return it to the ground by throwing the switch 196 to engage contacts 201 and 202. This completes the circuits described before for operating the motor in reverse direction and thus return the car to the ground and the lift to its initial position. Similarly, if occasion arises during automatic operation of the device to lift, turn, and set down the automobile, the motor may be reversed in operation at any phase in the cycle, simply by throwing the switch 196 in the other direction of throw, or stopping the motor by opening the switch and then, if desired, continuing the cycle by turning the switch 196 back to its original position. Thus, it is evident that the device is amenable to complete automatic operation, initiated by the single manipulation of a switch, or is amenable to arbitrary control at the will of an operator.

It will be apparent that the lift can be operated by anyone unskilled in mechanical arts to turn an automobile. Also, it may be operated by one familiar with mechanical devices to raise lower, and turn an automobile in any arbitrary manner, for servicing the automobile.

Where the switches are arranged in the operator's compartment, they may be lock switches so as to prevent accidental operation.

The stationary type of turntable has been described as a drive-way turntable and servicing device. Obviously, the device is adapted for garage and parking lot use, for servicing and automobile handling. If desired, the base 1 may be equipped with castors, to enable one to move the raised automobile about.

The invention has been described in detail to illustrate the invention. It is not intended so to limit the invention. Variations may be made in the details of the device shown and described, as will be apparent to one skilled in the art, without departing from the scope of the invention as defined in the following claims.

What I claim as my invention is as follows:

1. A lift and turntable comprising, in combination, a base, a hollow screw having one end mounted for rotation on the base, the axis of the screw being vertical when in operative position, a post fixed to the base and extending axially through the top of the screw, bearing means between the upper end of the screw and the post, a motor mounted on the base and arranged within the screw, a gear train within the screw, and connecting the motor and the screw, a nut on the outside of the screw and in engagement therewith, means on the nut for engaging an object to be lifted, means connected with the post for holding the nut against rotation relative to the base.

2. A lift and turntable comprising, in combination, a base, a hollow screw having one end mounted for rotation on the base, the axis of the screw being vertical when in operative position, a post fixed to the base and extending axially through the top of the screw, bearing means between the upper end of the screw and the post, a motor mounted on the base and arranged within the screw, a gear train within the screw, and connecting the motor and the screw, a nut on the outside of the screw and in engagement therewith, means on the nut for engaging an object to be lifted, means connected with the post for holding the nut against rotation relative to the base, and means for disconnecting the post and last-mentioned means so as to permit rotation of the nut relative to the base.

3. A lift and turntable comprising, in combination, a base, a hollow screw having one end mounted for rotation on the base, a post rigid with the base and extending axially through the end of the screw distant from the base, bearing means at the end of the screw distant from the base and engaged with the post, a motor mounted on the base within the hollow screw, gear means for driving the screw from the motor, a nut threaded on the outside of the screw, releasable means for holding the nut against rotation relative to the base.

4. A lift and turntable comprising, in combination, a base, a hollow screw having one end mounted for rotation on the base, a post rigid with the base and extending axially through the end of the screw distant from the base, bearing means at the end of the screw distant from the base and engaged with the post, a motor mounted on the base within the hollow screw, gear means for driving the screw from the motor, a nut threaded on the outside of the screw, releasable means for holding the nut against rotation relative to the base, manually operable means for releasing said releasable means at will.

5. A lift and turntable comprising, in combination, a base, a hollow screw having one end mounted for rotation on the base, a post rigid with the base and extending axially through the end of the screw distant from the base, bearing means at the end of the screw distant from the base and engaged with the post, a motor mounted on the base within the hollow screw, gear means for driving the screw from the motor, a nut threaded on the outside of the screw, releasable means for holding the nut against rotation relative to the base, means operable by travel of the nut on the screw for automatically releasing said releasable means.

6. In combination, a lift and turntable for an automobile having base means, lift means, and supporting means adapted to be raised relative to the base means by the lift means, collapsible structure mounted on the supporting means and connected with the automobile frame, said collapsible structure being constructed and arranged to permit raising and lowering movement of the lift and turntable, as a unit, between the ground and the automobile, means for converting the collapsible structure into compression load-bearing structure when the lift and turntable is arranged on the ground.

7. In combination, a lift and turntable for an automobile having base means, lift means, and supporting means adapted to be raised relative to the base means by the lift means, collapsible structure mounted on the supporting means and connected with the automobile frame, said collapsible structure being constructed and arranged to permit raising and lowering movement of the lift and turntable, as a unit, between the ground and the automobile, means for converting the collapsible structure into compression load-bearing structure when the lift and turntable is arranged on the ground, means connected with the lift and turntable and connected with the automobile for raising and lowering the lift and turntable relative to the automobile.

8. In combination, a lift and turntable for an automobile having base means, lift means, and supporting means adapted to be raised relative to the base means by the lift means, collapsible structure mounted on the supporting means and connected with the automobile frame, said collapsible structure being constructed and arranged to permit raising and lowering movement of the lift and turntable, as a unit, between the ground and the automobile, means for converting the collapsible structure into compression load-bearing structure when the lift and turntable is arranged on the ground, manually operable means for raising and lowering the lift and turntable relative to the automobile.

9. In combination, a lift and turntable for an automobile having base means, lift means, and supporting means adapted to be raised by the lift means, collapsible means connecting the supporting means with the automobile frame, said collapsible means being constructed and arranged to permit raising and lowering movement of the lift and turntable relative to the automobile, means for raising and lowering the lift and turntable relative to the automobile, means actuable by the last-mentioned means for converting the collapsible means to a compression load-bearing means and for converting the load-bearing means to the collapsible means.

10. In combination, a lift and turntable for an automobile having base means, lift means, and supporting means adapted to be raised by the lift means, collapsible means connecting the supporting means with the automobile frame, said collapsible means being constructed and arranged to permit raising and lowering movement of the lift and turntable relative to the automobile, means for raising and lowering the lift and turntable relative to the automobile, means for converting the collapsible means to a rigid load-bearing means, and means for supporting the lift and turntable from the automobile when the lift and turntable is in raised position relative to the automobile.

11. In combination, a lift and turntable for an automobile having base means, lift means, and supporting means adapted to be raised by the lift means, collapsible means connecting the supporting means to the automobile, said collapsible means being constructed and arranged to permit raising and lowering movement of the lift and turntable relative to the automobile, means for converting the collapsible means to rigid load-bearing means when the lift and turntable is arranged on the ground, power means for operating the lift and turntable to raise and lower the automobile, and means operable by said power means for raising and lowering the lift and turntable relative to the automobile.

12. In combination, a lift and turntable for an automobile having base means, lift means, and supporting means adapted to be raised by the lift means, collapsible means connecting the supporting means to the automobile, said collapsible means being constructed and arranged to permit raising and lowering movement of the lift and turntable relative to the automobile, means for converting the collapsible means to rigid load-bearing means when the lift and turntable is arranged on the ground, power means for operating the lift and turntable to raise and lower the automobile, and means operable by said power means for raising and lowering the lift and turntable relative to the automobile, said means for converting the collapsible means being operable by operation of the power means.

13. In combination, a lift and turntable for an automobile having base means, lift means, and supporting means adapted to be raised by the lift means, collapsible means connecting the supporting means to the automobile, said collapsible means being constructed and arranged to permit raising and lowering movement of the lift and turntable relative to the automobile, mechanism for converting the collapsible means to rigid load-bearing means, raising means for raising and lowering the lift and turntable relative to the automobile, power means and driving connections from the power means for operating the lift means, for operating the raising means, and for operating the mechanism.

14. In combination, a lift and turntable for an automobile having base means, lift means, and supporting means adapted to be raised by the lift means, collapsible means connecting the supporting means to the automobile, said collapsible means being constructed and arranged to permit raising and lowering movement of the lift and turntable relative to the automobile, mechanism for converting the collapsible means to rigid load-bearing means, raising means for raising and lowering the lift and turntable relative to the automobile, power means, driving means for operating the lift means from the power means, gear means for operating the raising means from the power means, and means for automatically shifting the power means from driving engagement with the driving means to the gear means, and from the gear means to the driving means.

15. In combination, a lift and turntable for an automobile having base means, lift means, and supporting means adapted to be raised by the lift means, collapsible means connecting the supporting means to the automobile, said collapsible means being constructed and arranged to permit raising and lowering movement of the lift and turntable relative to the automobile, mechanism for converting the collapsible means to rigid load-bearing means, raising means for raising and lowering the lift and turntable relative to the automobile, power means and driving means for operating the raising means to lower the lift and turntable to the ground, for shifting from driving the raising means to driving the lift means automatically, and for driving the lift means to raise the automobile.

16. A lift and turntable having base means, lift means, and supporting means adapted to support an automobile being raised from the ground, electrical power means for operating the lift means, to raise the supporting means, an electrical circuit including the power means and a source of electrical energy, automatic switch means in the circuit arranged for actuation to reverse the direction of operation of the power means when the supporting means reaches uppermost position, and means for automatically turning the automobile about a vertical axis when the supporting means reaches uppermost position.

17. A lift and turntable comprising a base means, a lift means, a supporting means adapted to support an automobile, electrical power means for operating the lift means, to raise and lower the supporting means, said supporting means being mounted for rotation about a vertical axis, holding means for preventing rotation of the supporting means relative to the base means, release means operable by approach of the supporting means to uppermost position to release the holding means so as to permit rotation of the supporting means about a vertical axis.

18. A lift and turntable comprising a base means, a lift means, a supporting means adapted to support an automobile, electrical power means for operating the lift means, to raise and lower the supporting means, said supporting means being mounted for rotation about a vertical axis, holding means for preventing rotation of the supporting means relative to the base means, release means operable by approach of the supporting means to uppermost position to release the holding means so as to permit rotation of the supporting means about a vertical axis, automatic switch means on the lift and turntable operable concurrently with actuation of the release means, an electrical circuit including the power means, the automatic switch means, and a source of electrical energy, said automatic switch means operating to reverse the direction of operation of the power means when actuated.

19. A lift and turntable comprising a base means, a lift means, a supporting means adapted to support an automobile, electrical power means for operating the lift means, to raise and lower the supporting means, said supporting means being mounted for rotation about a vertical axis, holding means for preventing rotation of the supporting means relative to the base means, release means operable by approach of the supporting means to uppermost position to release the holding means so as to permit rotation of the supporting means about a vertical axis, automatic switch means on the lift and turntable operable concurrently with actuation of the release means, an electrical circuit including the power means, the automatic switch means, and a source of electrical energy, said automatic switch means operating to reverse the direction of operation of the power means when actuated, manual switch means in the electrical circuit operable to reverse the direction of operation of the power means arbitrarily and independently of the automatic switch means.

20. A lift and turntable comprising a base means, a lift means, a supporting means adapted to support an automobile, electrical power means for operating the lift means, to raise and lower the supporting means, said supporting means being mounted for rotation about a vertical axis, holding means for preventing rotation of the supporting means relative to the base means, release means operable by approach of the supporting means to uppermost position to release the holding means so as to permit rotation of the supporting means about a vertical axis, automatic switch means on the lift and turntable operable concurrently with actuation of the release means, an electrical circuit including the power means, the automatic switch means, and a source of electrical energy, said automatic switch means operating to reverse the direction of operation of the power means when actuated, manual switch means in the electrical circuit operable to reverse the direction of operation of the power means arbitrarily and independently of the automatic switch means, a limit switch connected in the circuit, operably by return of the supporting means to starting position for stopping the power means and for setting the circuit to begin another cycle of operation.

ENOCH E. WOODMAN.